United States Patent
Xu et al.

(10) Patent No.: US 12,302,226 B2
(45) Date of Patent: May 13, 2025

(54) UNIFIED ACCESS CONTROL (UAC) ENHANCEMENT FOR SIDELINK RELAY

(71) Applicant: Apple Inc., Cupertino, CA (US)

(72) Inventors: Fangli Xu, Beijing (CN); Zhibin Wu, San Diego, CA (US); Yuqin Chen, Saratoga, CA (US); Sarma V Vangala, Cupertino, CA (US); Naveen Kumar R Palle Venkata, San Diego, CA (US); Sethuraman Gurumoorthy, San Diego, CA (US); Srirang A Lovlekar, Fremont, CA (US); Haijing Hu, Saratoga, CA (US); Dawei Zhang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/766,546

(22) PCT Filed: May 8, 2021

(86) PCT No.: PCT/CN2021/092294
§ 371 (c)(1),
(2) Date: Apr. 5, 2022

(87) PCT Pub. No.: WO2022/236455
PCT Pub. Date: Nov. 17, 2022

(65) Prior Publication Data
US 2024/0056954 A1    Feb. 15, 2024

(51) Int. Cl.
*H04W 48/16* (2009.01)
*H04W 76/20* (2018.01)

(52) U.S. Cl.
CPC .......... *H04W 48/16* (2013.01); *H04W 76/20* (2018.02)

(58) Field of Classification Search
CPC .............................. H04W 48/16; H04W 76/20
See application file for complete search history.

(56) References Cited

U.S. PATENT DOCUMENTS

| 2018/0279195 A1 | 9/2018 | Kim et al. | |
| 2019/0182747 A1* | 6/2019 | Chun | H04W 48/08 |
| 2020/0052963 A1* | 2/2020 | Kim | H04L 41/0806 |

(Continued)

FOREIGN PATENT DOCUMENTS

| CN | 111052709 A | 4/2020 | |
| WO | 2016182597 A1 | 11/2016 | |
| WO | WO-2019032798 A1 * | 2/2019 | H04W 28/0268 |

OTHER PUBLICATIONS

PCT Search Report dated Jan. 25, 2022 in connection with PCT Application No. PCT/CN2021/092294.

(Continued)

*Primary Examiner* — Duc C Ho
(74) *Attorney, Agent, or Firm* — Eschweiler & Potashnik, LLC; Ningjiao Zhang

(57) ABSTRACT

A user equipment (UE) configured as a relay UE between a remote UE and a base station is disclosed. The UE comprises one or more processors configured to receive a RRC signaling to request for establishing or resuming RRC connection from the remote UE, determine whether to perform an access control check prior to forwarding the RRC Signaling of the remote UE to the base station, and forward the RRC Signaling to the base station based on the determination.

20 Claims, 9 Drawing Sheets

(56) References Cited

U.S. PATENT DOCUMENTS

| | | | | |
|---|---|---|---|---|
| 2020/0329524 | A1* | 10/2020 | Park | H04W 48/16 |
| 2021/0022107 | A1* | 1/2021 | Kadiri | H04W 68/005 |
| 2021/0368417 | A1* | 11/2021 | Luo | H04W 40/22 |
| 2022/0124573 | A1* | 4/2022 | Tsai | H04W 36/0079 |

OTHER PUBLICATIONS

PCT Written Opinion dated Jan. 26, 2022 in connection with PCT Application No. PCT/CN2021/092294.

ZTE Summary report of [AT113bis-e][603][Relay] Proposals from summary of agenda item 8.7.4.1 (ZTE) 3GPP TSG-RAN WG2 Meeting #113bis electronic R2-2104405 Apr. 20, 2021.

Qualcomm Incorporated System information, paging delivery and UAC in L2 U2N relay 3GPP TSG RAN WG2 Meeting #113bis-e R2-2102695 Apr. 20, 2021.

LTE; Evolved Universal Terrestrial Radio Access (E-UTRA); Radio Resource Control (RRC); Protocol specification (3GPP TS 36.331 version 16.3.0 Release 16); ETSI TS 136 331 V16.3.0 (Jan. 2021); pp. 1-150.

LTE; Evolved Universal Terrestrial Radio Access (E-UTRA); Radio Resource Control (RRC); Protocol specification 3GPP TS 36.331 version 16.3.0 Release 16); ETSI TS 136 331 V16.3.0 (Jan. 2021); pp. 151-300.

LTE; Evolved Universal Terrestrial Radio Access (E-UTRA); Radio Resource Control (RRC); Protocol specification (3GPP TS 36.331 version 16.3.0 Release 16); ETSI TS 136 331 V16.3.0 (Jan. 2021); pp. 301-450.

LTE; Evolved Universal Terrestrial Radio Access (E-UTRA); Radio Resource Control (RRC); Protocol specification (3GPP TS 36.331 version 16.3.0 Release 16); ETSI TS 136 331 V16.3.0 (Jan. 2021); pp. 451-600.

LTE; Evolved Universal Terrestrial Radio Access (E-UTRA); Radio Resource Control (RRC); Protocol specification 3GPP TS 36.331 version 16.3.0 Release 16); ETSI TS 136 331 V16.3.0 (Jan. 2021); pp. 601-750.

LTE; Evolved Universal Terrestrial Radio Access (E-UTRA); Radio Resource Control (RRC); Protocol specification 3GPP TS 36.331 version 16.3.0 Release 16); ETSI TS 136 331 V16.3.0 (Jan. 2021); pp. 751-900.

LTE; Evolved Universal Terrestrial Radio Access (E-UTRA); Radio Resource Control (RRC); Protocol specification 3GPP TS 36.331 version 16.3.0 Release 16); ETSI TS 136 331 V16.3.0 (Jan. 2021); pp. 901-1088.

International Preliminary Report on Patentability dated Nov. 23, 2023 in connection with Application Serial No. PCT/CN2021/092294.

* cited by examiner

UNIFIED ACCESS CONTROL (UAC) ENHANCEMENT FOR SIDELINK RELAY

This application is a National Phase entry application of International Patent Application No. PCT/CN2021/092294 filed May 8, 2021, entitled "UNIFIED ACCESS CONTROL (UAC) ENHANCEMENT FOR SIDELINK RELAY", the contents of which are herein incorporated by reference in their entirety.

FIELD

The present disclosure relates to the field of wireless communication systems, including apparatus, system, and method for enhancing Unified Access Control (UAC) for sidelink relay.

BACKGROUND

It is becoming more important to be able to provide telecommunication services to fixed and mobile subscribers as efficient and inexpensively as possible. Further, the increased use of mobile applications has resulted in much focus on developing wireless systems capable of delivering large amounts of data at high speed.

Wireless relaying communication has attracted attentions for network coverage extension and transmission reliability improvement. Sidelink (SL) communication can be used to facilitate direct device-to-device communication and to extend coverage of the wireless systems by using a user equipment (UE) for relaying when a remote UE is out of network coverage. Solutions for coverage and reliability continue to evolve to include enhancements and new features.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
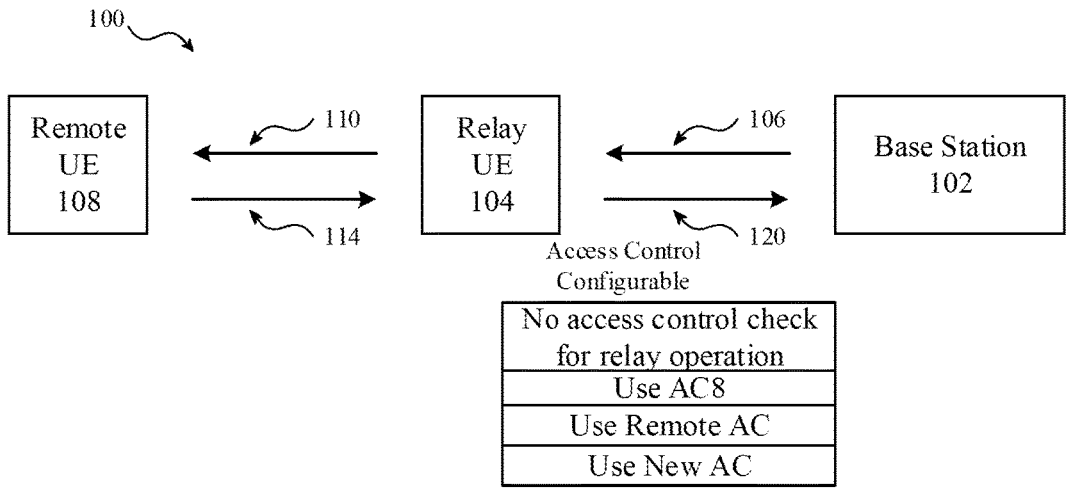
FIG. 1 illustrates a block diagram of a wireless communication system 100 including a relay UE acting as a relay between a remote UE and a base station, according to one aspect of the disclosure.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Wireless communication networks, enabling voice and data communications to mobile devices, continue to advance in various aspects such as technological sophistication, system capacity, data rates, bandwidth, supported services, and the like. A basic model of one type of wireless networks, generally known as "cellular," features a plurality of fixed network nodes (known variously as base station, radio base station, base transceiver station, serving node, NodeB, eNodeB, eNB, gNodeB, gNB and the like, and hereafter referred as base station or BS), each providing wireless communication service to a large plurality of fixed or mobile devices (such as a mobile phone, tablet computer, an internet of things (IoT) device, a vehicle-to-everything (V2X) UE, etc, which are known variously as mobile terminals, user equipment and the like, and hereafter referred as user equipment or UE) within a generally fixed geographical area, known as a cell or sector. In some aspects, this disclosure focuses on a new radio (NR) communication system. However, in other aspects, the disclosure may be associated with other wireless communication technologies, for example, LTE or any future wireless communication technologies.

For high load situations where various UEs request connection and communication with a BS, accessibility control is important to selectively limit incoming traffic. By leveraging different connection types, a stable network condition and service quality can be provided by the BS based on the connection priority of a UE. As an example, in NR, when the UE has data to transmit, the UE is configured to perform a unified access control (UAC) check to control access attempts to the BS. In the UAC, each access attempt from the UE is categorized into one or more of the Access Identities and one of the Access Categories. Based on the access control information applicable for the corresponding Access Identity and Access Category of the access attempt, the UE performs a test whether the actual access attempt can be made or not. The wireless communication network shall broadcast barring control information (i.e. a list of barring parameters associated with Access Identity and Access Category). The UE is configured to determine whether or not a particular new access attempt is allowed based on the barring parameters the UE receive from the broadcasted barring control information and the configuration in the UE.

The Third Generation Partnership Project (3GPP) standardized using sidelink communication between UEs to extend coverage of a wireless systems. A relay UE within coverage of a wireless network can be used for relaying a remote UE out of network coverage. However, how access control is applied in the sidelink relay still needs to be studied.

Accordingly, the present disclosure is related to access control enhancement for a sidelink relay. In one aspect, for a relay operation in NR, a relay UE is configured to forward UAC parameters of a cell, as part of a system information block (SIB1), to a remote UE. The remote UE is configured to perform a UAC check to determine whether an access attempt is authorized based on the UAC parameters received from the relay UE. The remote UE then transmits a radio resource control (RRC) signaling to request for establishing or resuming RRC connection from the remote UE to the relay UE when the UAC check is passed. The RRC signaling may be or may include a RRC setup request such as RRCSetupRequest signal defined in 3GPP. While the term RRC setup request is widely used in the disclosure, it is not limited to the RRCSetupRequest signal defined in 3GPP. Rather, RRC setup request signal means to be RRC signaling to request for establishing or resuming RRC connection. Upon receiving the RRC setup request, in one aspect, the relay UE may forward the RRC setup request to a BS without performing another access control check. In an alternative aspect, the relay UE may perform an enhanced UAC check before forwarding the RRC setup request to the BS. As more details will be provided below, the enhanced UAC check may include using an appointed Access Category (e.g., Access Category 8 (AC8) mobile originated (MO) signaling for RRC), using UAC barring information (e.g., Access Identity and an Access Category) based on or provided by the remote UE, or using a new Access Category specifically applied to the relaying operation. Procedures following a barred UAC check will also be discussed.

FIG. 1 illustrates an example of a relay user equipment (UE) 104 acting as a relay between a remote UE 108 and a BS 102. The relay UE 104 is in-coverage with respect to network of the BS 102 and can be connected to the BS 102 via a Uu interface. The remote UE 108 is out-of-coverage with respect to network of the BS 102 and may not be directly connected to the BS 102, but rather is directly connected to the relay UE 104 via a PC5 interface. The relay UE 104 can act as an intermediary between the remote UE 108 and the BS 102.

In one aspect, to initiate UE-to-Network relay operation between the relay UE 104 and the BS 102, the BS 102 broadcasts a generic network configuration message such as SIB1 to a plurality of UEs at 106. The SIB1 may include relay configuration information and a UAC barring control information.

The relay configuration information contains cell specific information including various generic relay-related cell-wide configuration parameters (or relay configuration parameters), such as a threshold relay lower parameter, a threshold relay upper parameter, etc. In one example, the threshold relay lower parameter can represent a Uu link quality threshold above which a given UE can act as a relay. In other words, the given UE should have a link quality of a certain level in order to support acting as a relay for the remote UE 108. The threshold relay lower parameter can be used to reduce the likelihood that UEs in poor coverage situations become relays, thereby avoiding excess use of the cell's resources to carry the relayed traffic between the BS 102 and the relay UE 104. In one example, the threshold relay upper parameter can represent an upper threshold of Uu link quality above which a given UE cannot act as a relay. The threshold relay upper parameter can be used to reduce the likelihood that UEs located in proximity to the cell center become relays. UEs located in proximity to the cell center are unlikely to be useful for the purpose of relaying traffic from remote UEs that are out of coverage, and therefore, the resource usage and interference associated with discovery announcements can be avoided.

In one aspect, the UAC barring control information includes a list of barring parameters associated with Access Identity and Access Category such as an indication of which Access Category and Access Identity are allowed to be transmitted to the BS 102. The relay UE 104 forwards the UAC barring control information to the remote UE 108 at 110. When the remote UE has a communication need, an access control check is performed to determine whether an access attempt is authorized by the BS 102 based on the received UAC barring control information. The remote UE 108 then transmits a RRC setup request to the relay UE 104 when it is determined the access attempt is authorized at 114. Before forwarding the RRC setup request to the BS 102, the relay UE 104 may or may not perform an access control check. If the Relay UE 104 does not perform the access control check, or the access control check is passed, the RRC setup request is forwarded to the BS 102.

In one aspect, the relay UE 104 is configured to not perform an access control check for performing the relay operation. In this example the UE 104 forwards the RRC setup request of the remote UE 108 to the BS 102 without performing an access control check. One concern for this approach is that the relay UE 104 is not subject to UAC-config in SIB1 if the relay UE 104 has been granted the privilege of no access control check. This means that the relay UE 104's own traffic may also be able to reach the network without any access control check when the relay UE 104 enters CONNECTED status. To address this concern, the BS 102 may be configured to check whether the relay UE 104 transmits relay information for a remote UE or its own traffic and to revoke access of the relay UE 104 if the relay UE 104 skips the access control check for its own communication needs.

In one alternative aspect, the relay UE 104 is configured to perform an enhanced access control check for relay operation to determine whether to forward the RRC setup request of the remote UE 108 to the BS 102. When performing the relay function for the remote UE 108, the relay UE 104 may be configured to perform a UAC check using various Access Categories. In one aspect, an appointed Access Category, such as Access Category 8 (AC8) mobile originated (MO) signaling for RRC is used for the Relay UE 104 to perform the access control check.

In an alternative aspect, content of the RRC setup request received from the remote UE 108 is checked by the relay UE 104. A proper Access Category may be determined based on the content of the RRC setup request received from the remote UE 108, such as RRC establishment-cause or RRC resume-cause. For example, if the remote UE 108's access attempt is triggered by core network paging, then the Access Category used by the remote UE 108 is AC0. The relay UE 104 shall also be evaluated with AC0 for its access barring, instead of AC8. This can help to avoid unnecessary access barring in the relay UE. If the remote UE 108 has an emergency, then relay access of the relay UE 104 may be also categorized as emergency (AC2) instead of AC8. The relay UE can examine the RRC message from the remote UE 108 and determine the reason for access and choose a proper AC correspondingly.

Alternatively, the Access Category of the remote UE is contained in the RRC setup request and provided for use by the relay of the relay UE 104. In a further alternative aspect, a new Access Category is specifically applied to the relaying operation to perform the UAC check.

In one aspect, the determination of whether to perform the access control check is configurable. The determination of whether to perform the access control check may be made according to an indication associated with barring control information received from the BS 102. For example, besides receiving UAC barring control information for its own communication, the relay UE 104 also receives an indication of whether an access control check is needed for the relay UE 104 to serve as a relay to another UE as part of the barring control information. In one aspect, the barring control information may also indicate an access control scheme for the relay UE 104 from a list of different access control schemes such as the usage of various Access Categories as described above.

In one aspect, the relay UE 104 is configured to determine whether to perform the access control check based on a previous relay operation. The Access Category of the remote UE 108 is compared with an Access Category of the same or different remote UE that previously transmitted a RRC setup request. If the Access Categories are the same, no new UAC check is triggered. The Access Categories of remote UEs may be included and transmitted from the remote UEs to the relay UE 104 in the RRC setup request.

In one aspect, the relay UE 104 is also configured to perform the access control check for a different remote UE or the same remote UE with a different Access Category even if the barring timer still runs for a previous relay request from a previous remote UE. When a relay operation for a first remote UE is barred, the relay UE 104 is still allowed to perform a second access control check when receiving a second RRC setup request from a second remote UE different from the first remote UE. This may be a factor when the second remote UE has a different Access Category. Multiple barring timers can be adopted for different remote UEs or the same remote UE with different Access Categories, so that the second access control check can be performed when a first barring timer for the relay of the first remote UE is still running. In one aspect, the relay UE 104 is configured to assign a different barring timer for each Access Category.

In one aspect, the relay UE 104 is also configured to transmit its own RRC state information to the remote UE 108 together with the UAC barring control information. In one aspect, the RRC state information may be included in the forwarded UAC barring control information. In one aspect, the relay UE 104 is also configured to announce a relay discovery message including the RRC state information of the relay UE 104 and relay indication information. In one aspect, the remote UE 108 is configured to receive the RRC state information of the relay UE and use the RRC state information to select a proper relay UE.

Figure 2:
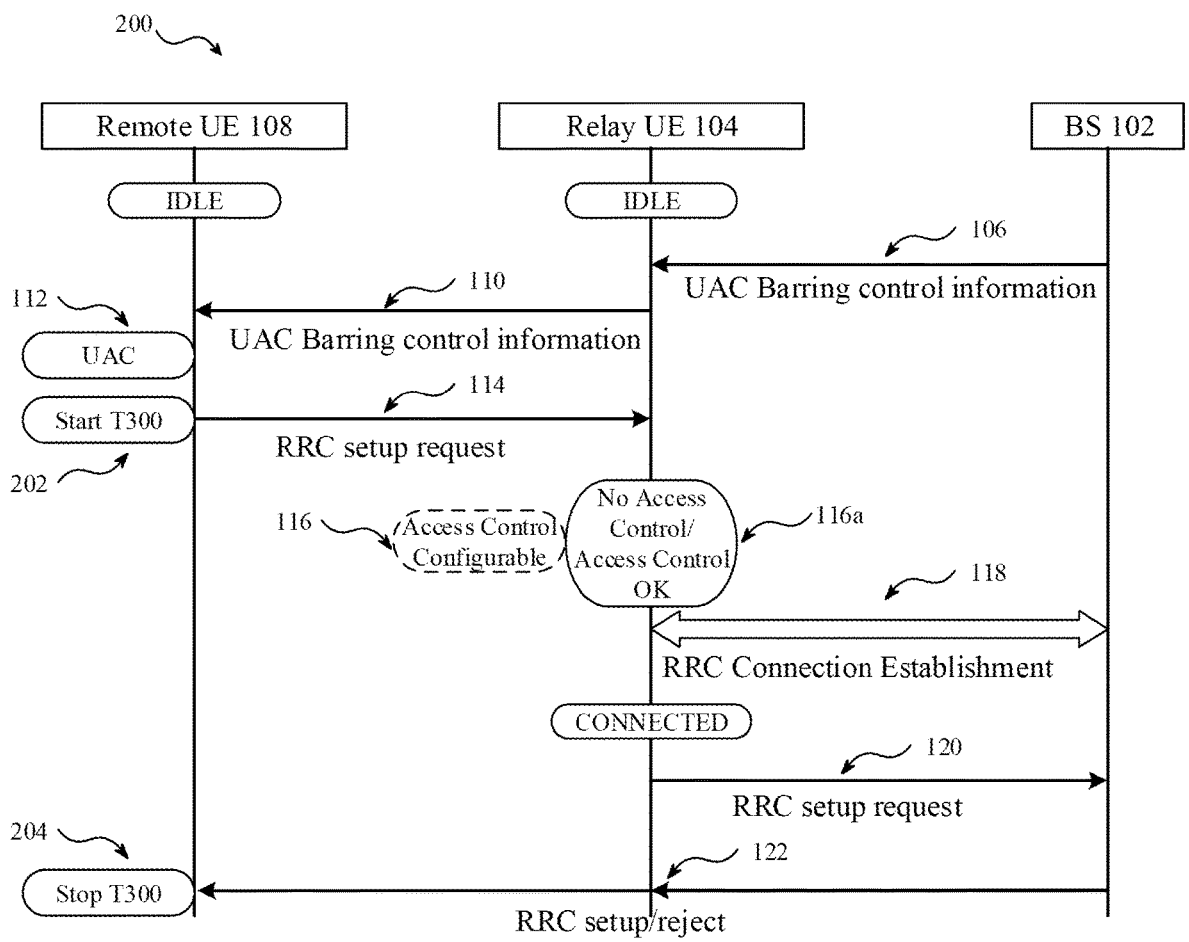
FIG. 2 illustrates a message flow diagram of a sidelink relaying process including enhanced UAC of a relay UE according to one aspect of the disclosure.

FIG. 2 illustrates a message flow diagram of a sidelink relaying process for a remote UE 108 including enhanced UAC of a relay UE 104 according to one aspect of the disclosure. The remote UE 108 and the relay UE 104 may operate in an IDLE/INACTIVE state when disconnected from a core network (CN) in order to reduce power consumption. While in IDLE/INACTIVE, the relay UE 104 performs cell re-selection and can receive paging messages from a BS 102 on which the relay UE 104 is camping.

At 106, the BS 102 broadcasts a generic network configuration message such as a system information block (SIB1). The generic network configuration message includes relay configuration information and UAC barring control information. The relay configuration information is used to determine the qualification of a UE to act as a relay UE. For example, UEs in poor coverage situations may not be approved to act as relays, thereby avoiding excess use of the cell's resources to carry the relayed traffic. UEs located in proximity to the cell center are unlikely to be useful for the purpose of relaying traffic from remote UEs that are out of coverage, and therefore, the resource usage and interference associated with discovery announcements can be avoided by not approving such UEs to act as relay UEs. The UAC barring control information is used to determine whether or not a particular new access attempt should be allowed based on the configuration of a UE. The UAC barring control information may include a list of barring parameters associated with Access Identity and Access Category.

At 110, upon determining the relay UE 104 is qualified to be used as a relay, the relay UE 104 forwards the UAC barring control information to the remote UE 108 using device-to-device sidelink communication.

At 112, when the remote UE has a communication need, a UAC check is performed to determine whether an access attempt is authorized by the BS 102 based on the received UAC barring control information.

At 114, when the UAC check at 112 is successful and the access attempt is authorized, the remote UE 108 then transmits a RRC setup request to the relay UE 104. The remote UE 108 starts a first timer (e.g. T300) as indicated by Block 202 when the remote UE 108 transmits the RRC setup request to the relay UE 104.

At 116, in one aspect, a UAC check is not performed for the relay UE 104 prior to forwarding the RRC setup request of the remote UE 108 to the BS 102. In this case, when the UAC check is passed at the remote UE 108, the RRC setup request is relayed to the BS 102 without additional access control check. In one alternative aspect, an enhanced UAC is performed for the relay UE 104 prior to forwarding the RRC setup request of the remote UE 108 to the BS 102.

One access control scheme for the relay operation of the relay UE 104 is to use appointed Access Category, such as Access Category 8 (AC8) mobile originated (MO) signaling for RRC. Alternatively, an actual Access Category may be determined based on the content of the RRC setup request received from the remote UE 108, so that the access control check is based on the real reason of access by the remote UE 108. For example, the actual Access Category may be determined from RRC establishment-cause or RRC resume-cause of the RRC setup request received from the remote UE 108. Alternatively, the Access Category of the remote UE 108 may be provided to the relay UE 104 through the RRC setup request and used for UAC check of the relay operation of the relay UE 104. In a further alternative aspect, a new Access Category is specifically applied to the relaying operation to perform the UAC check.

In a further aspect, the determination of whether to perform the access control check is configurable. The determination of whether to perform the access control check may be made according to barring control information received from the BS 102. Besides the UAC barring control information, the barring control information broadcast by the BS 102 may also indicate whether an access control check is needed for the relay UE 104 to serve as a relay to another UE. The barring control information may also indicate an access control scheme for the relay UE 104 from a list of different access control schemes such as any of the access control schemes described above.

In addition, the relay UE 104 may be configured to determine whether to perform the access control check based on a previous relay operation. The Access Category of the remote UE 108 is compared with an Access Category of the same or different remote UE that previously transmitted a RRC setup request. If the Access Categories are the same, no new UAC check is triggered. The Access Categories may be included and transmitted from the remote UEs to the relay UE 104 in the RRC setup request.

At 118, if the relay UE 104 does not perform the access control check, or the access control check is successful as indicated by Block 116*a*, the relay UE 104 performs an RRC connection establishment process in which the relay UE 104 may use a random access channel (RACH) process to connect to the BS 102. The relay UE 104 enters a CONNECTED state.

At 120, the RRC setup request is forwarded to the BS 102.

At 122, the BS 102 sends back a RRC setup or RRC reject message to the remote UE 108 through the relay UE 104. In one aspect, the BS 102 is configured to check whether the relay UE 104 transmits relay information for a remote UE or its own traffic and revoke access of the relay UE 104 if the relay UE 104 skips the access control check for its own communication needs. The first timer (e.g. T300) is stopped as indicated by Block 204 when the remote UE 108 receives the RRC setup or the RRC reject message.

Figure 3:
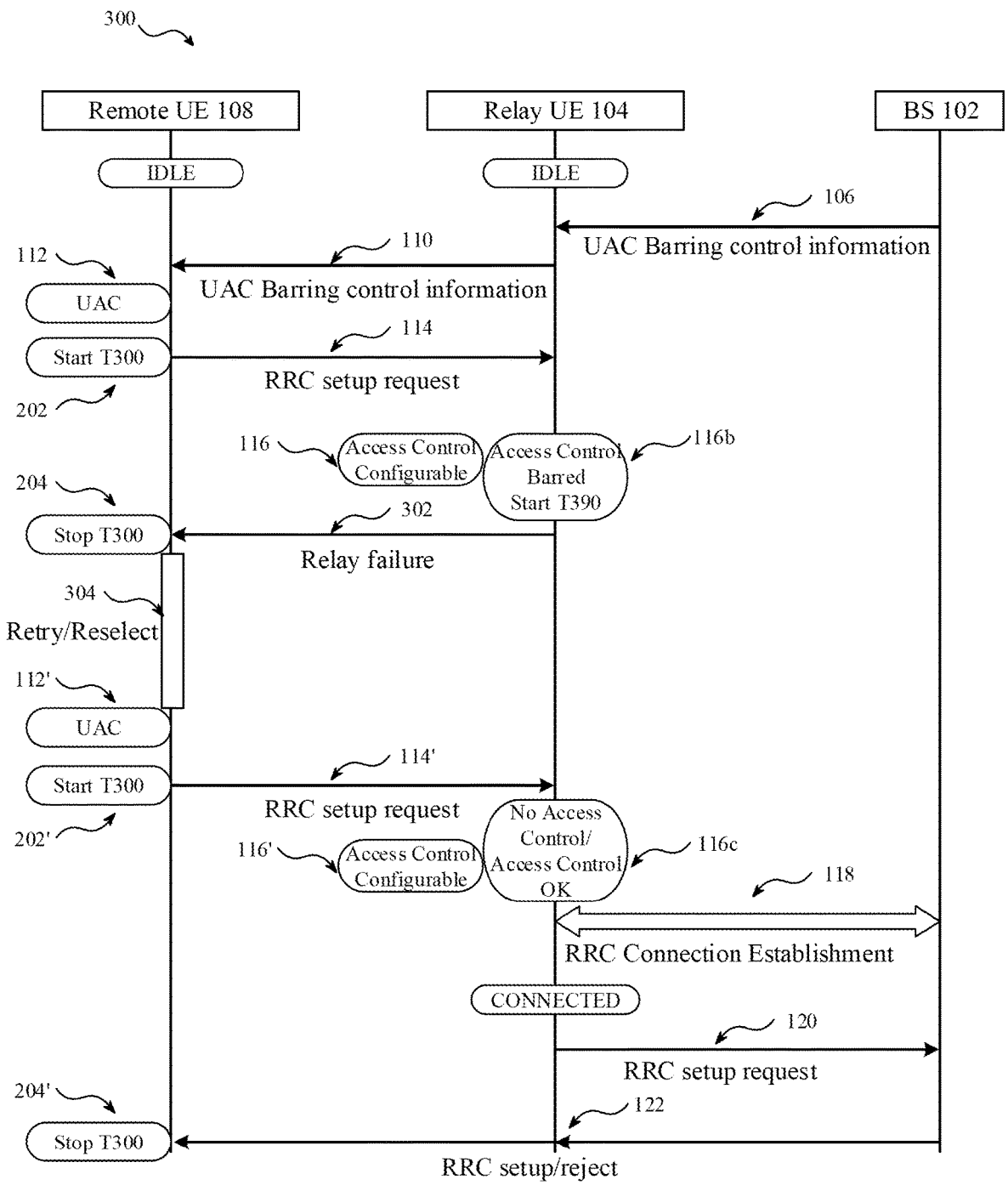
FIG. 3 illustrates a message flow diagram of a sidelink relaying process including enhanced UAC of a relay UE and access retry of a remote UE according to one aspect of the disclosure.

FIG. 3 illustrates a message flow diagram of a sidelink relaying process including enhanced UAC of the relay UE 104 and an access retry of a remote UE 108 according to one aspect of the disclosure. FIG. 3 shows a situation where at 116, the relay UE 104 performs the enhanced UAC for relaying RRC setup request of the remote UE 108 as discussed above associated with FIG. 2. In the example of FIG. 3 the access request is barred as indicated by Block 116*b*, and a barring timer (e.g. T390) is started for the relay UE 104. In one aspect, the barring timer (e.g. T390) starts when the access attempt is barred and stops upon cell selection or reselection, upon entering RRC_Connected, upon reception of RRCReconfiguration, and so on.

At 302, relay failure information is transmitted to the remote UE 108. In one aspect, the relay failure information is transmitted to the remote UE 108 via a PC5-RRC signaling. The relay failure information includes an indication that relay access is barred and may also include a wait time. The wait time is equal to or greater than the barring timer (e.g. T390). Upon receiving the Relay Failure information, the remote UE 108 stops the first timer (e.g. T300). The remote UE 108 may be configured to reselect another relay UE or retry connection later (after the wait time) as indicated by Block 304. In one aspect, the remote UE 108 performs a retry without performing a UAC check again.

Similar to the discussion above associated with FIG. 2, at 114', the remote UE 108 transmits a RRC setup request to the relay UE 104 and restarts the first timer (e.g. T300). At 116', in one aspect, a determination is made as to whether to perform a UAC check. If the UAC check is not performed or is successfully performed as indicated by Block 116*c*, the relay UE 104 performs an RRC connection establishment process at 118, in which the relay UE 104 may use a random access channel (RACH) process to connect to the BS 102. The relay UE 104 enters a CONNECTED state. At act 120, the RRC setup request is forwarded to the BS 102. At act 122, the BS 102 may send back a RRC setup or RRC reject message to the remote UE 108 through the relay UE 104. The first timer (e.g. T300) is stopped when the remote UE 108 receives the RRC setup or the RRC reject information.

Figure 4:
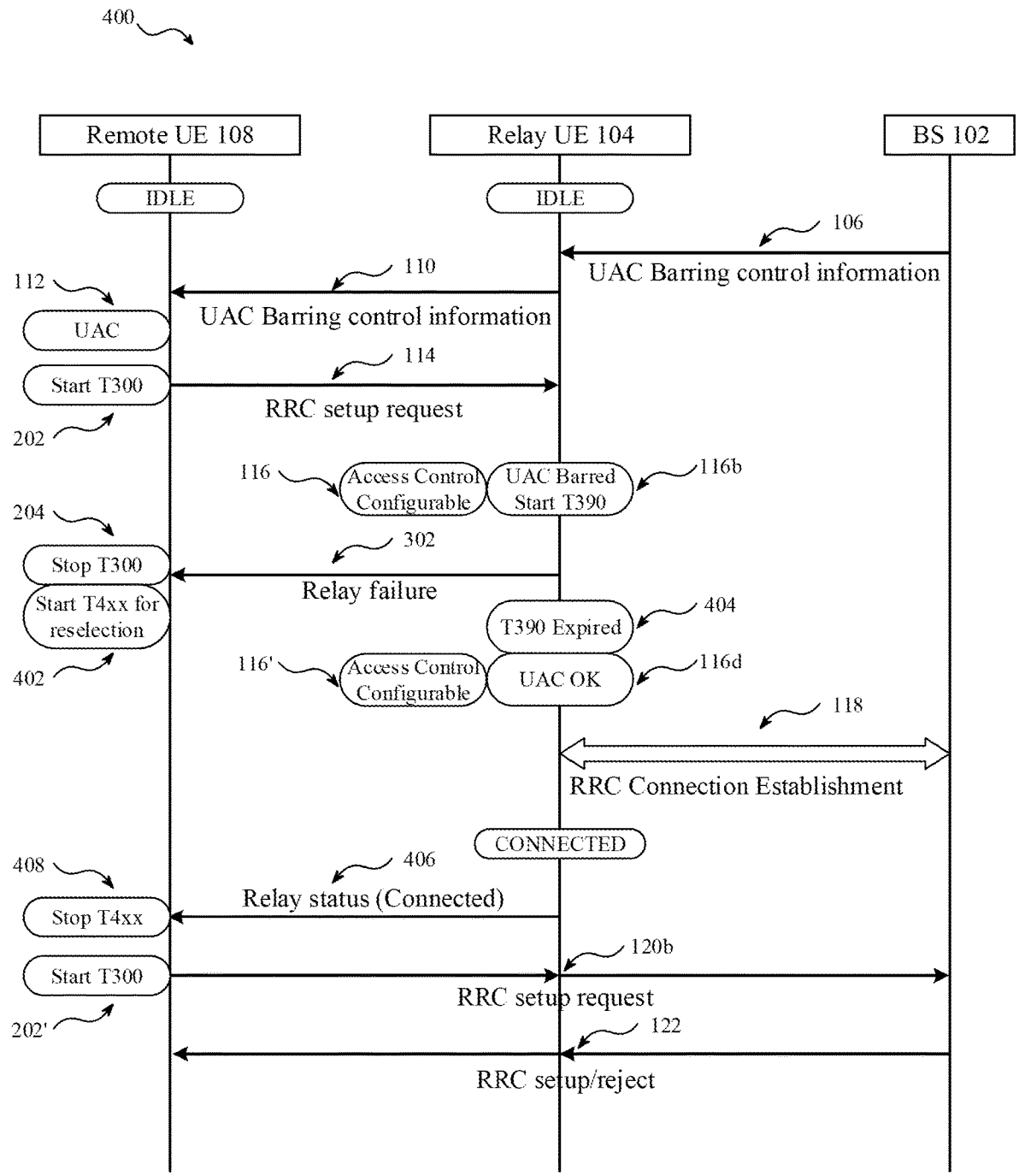
FIG. 4 illustrates a message flow diagram of a sidelink relaying process including enhanced UAC of a relay UE and access retry of a remote UE according to an alternative aspect of the disclosure.

FIG. 4 illustrates a message flow diagram of a sidelink relaying process including enhanced UAC of a relay UE 104 and access retry of the relay UE 104 according to an alternative aspect of the disclosure. FIG. 4 shows a situation where at act 116, the relay UE 104 performs the enhanced UAC for relaying RRC setup request of the remote UE 108 as discussed above associated with FIG. 2. In the example of FIG. 4 the access request is barred as indicated by Block 116*b*. At 302, the relay UE 104 starts a barring timer (e.g. T390) and sends relay failure information to the remote UE 108. The relay failure information includes an indication that relay access is barred and may also include a wait time. The wait time is equal to or greater than the barring timer (e.g. T390).

Upon receiving the relay failure information, the remote UE 108 stops the first timer (e.g. T300) as indicated by Block 204 and restarts a reselection timer (e.g. T4xx) as indicated by Block 402. The remote UE 108 is configured to wait for further indication from the relay UE 104 when the relay UE 104 enters the CONNECTED state. The remote UE 108 may be configured to reselect another relay UE or retry connection later after the reselection timer (e.g. T4xx) expires.

Meanwhile, at 116', the relay UE 104 may attempt to enter CONNECTED state after the barring timer (e.g. T390) expires, as indicated by Block 404. In one aspect, a determination is made whether to perform a UAC check for the relay operation of the relay UE 104. If UAC is not performed or successfully performed as indicated by Block 116*d*, the relay UE 104 performs an RRC connection establishment process at act 118, in which the relay UE 104 may use a random access channel (RACH) process to connect to the BS 102. The relay UE 104 enters the CONNECTED state. At act 406, relay status information is transmitted from the relay UE 104 to the remote UE 108. The relay status information indicates that the relay UE 104 is in the CONNECTED state.

In response to the relay status information, the remote UE 108 stops the reselection timer (e.g. T4xx), transmits the RRC setup request to the BS 102 through the relay UE 104 at 120*b*, and starts the first timer (e.g. T300). At 122, the BS 102 may send back a RRC setup or RRC reject message to the remote UE 108 through the relay UE 104. The first timer (e.g. T300) is stopped when the remote UE 108 receives the RRC setup or the RRC reject message.

Figure 5:
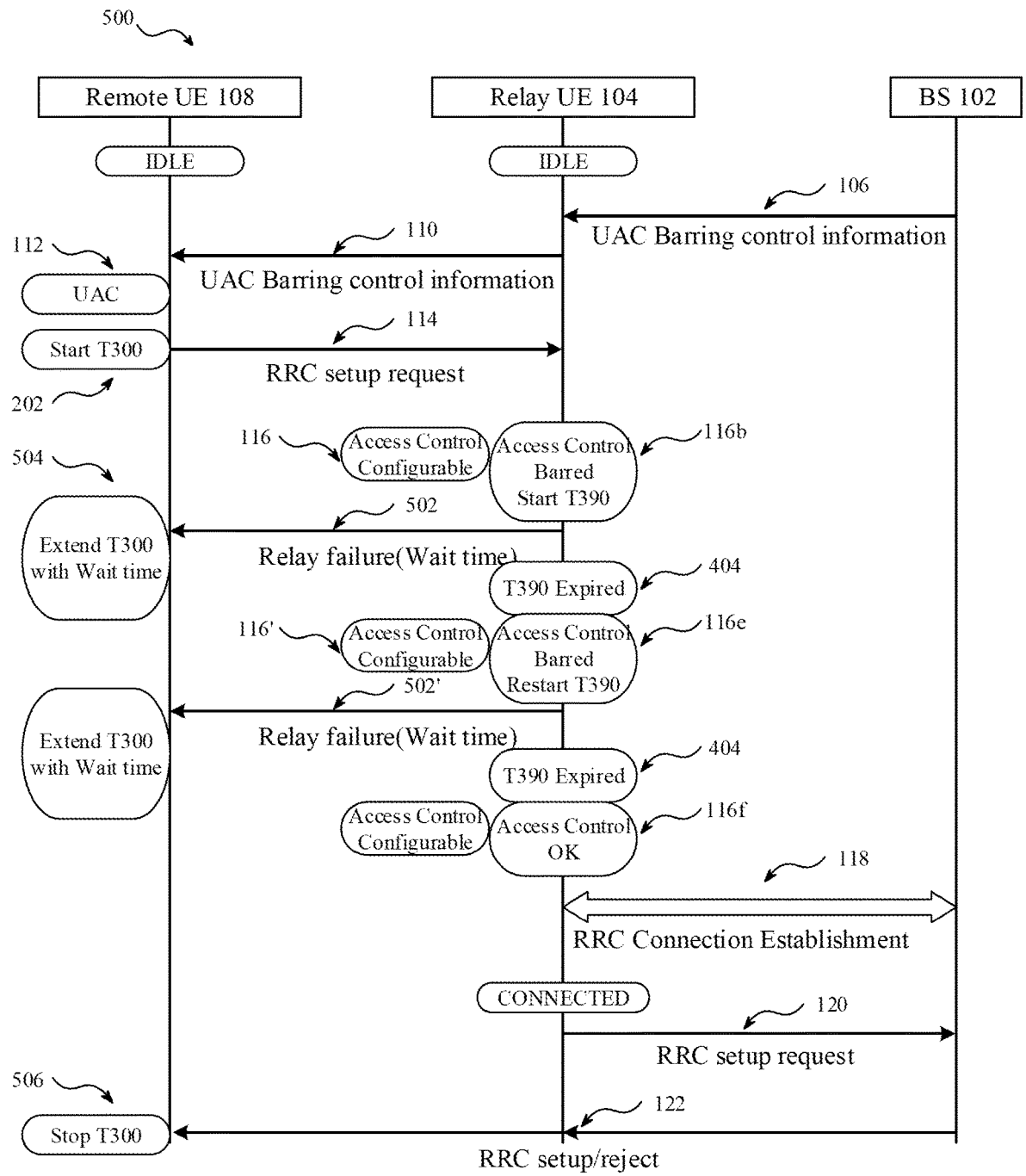
FIG. 5 illustrates a message flow diagram of a sidelink relaying process including enhanced UAC of a relay UE and access retry of the relay UE according to an alternative aspect of the disclosure.

FIG. 5 illustrates a block diagram of a sidelink relaying process including enhanced UAC of a relay UE 104 and message buffering and access retry of the relay UE 104 according to an alternative aspect of the disclosure. FIG. 5 shows a situation where at 116, the relay UE 104 performs the enhanced UAC for relaying RRC setup request of the remote UE 108 as discussed above associated with FIG. 2. In the example of FIG. 5 the access request is barred, and the relay UE 104 starts a barring timer (e.g. T390) as indicated by Block 116*b*. At 502, the relay UE 104 sends relay failure information to the remote UE 108. The relay failure information includes an indication that relay access is barred and may also include a wait time. The wait time is equal to or greater than the barring timer (e.g. T390).

Upon receiving the relay failure information, the remote UE 108 extends the first timer (e.g. T300) as indicated by Block 504. The remote UE 108 is configured to wait for the RRC setup/reject message forwarded by the relay UE 104. The remote UE 108 may be configured to reselect another relay UE or retry connection later after the extended first timer (e.g. T300) expires.

After the access request is barred, in one aspect, the relay UE 104 is configured to buffer the RRC setup request received from the remote UE 108 and wait to retry access after the barring timer (e.g. T390) expires as indicated by Blocks 404. At 116', an enhanced UAC checking process can be performed. When the relay access is barred, the barring timer (e.g. T390) is restarted as shown by Block 116*e*, the relay failure information is transmitted to the remote UE 108 at 502', and the first timer (e.g. T300) is extended with a wait time received with the relay failure information as shown by Block 504'. This access retry process can be repeated multiple times as shown in FIG. 5, until the enhanced UAC checking is successful as shown by Block 116*f* as an example, or a relay reselection shall be triggered if the number of failed attempts exceeds a certain configured threshold. The relay UE 104 then performs an RRC connection establishment process at act 118, and the relay UE 104 enters the CONNECTED state. Then the relay UE 104 is configured to transmit the buffered RRC setup request to the BS 102. At act 122, the BS 102 may send back a RRC setup or RRC reject message to the remote UE 108 through the relay UE 104. The first timer (e.g. T300) is stopped when the remote UE 108 receives the RRC setup or the RRC reject message.

Figure 6:
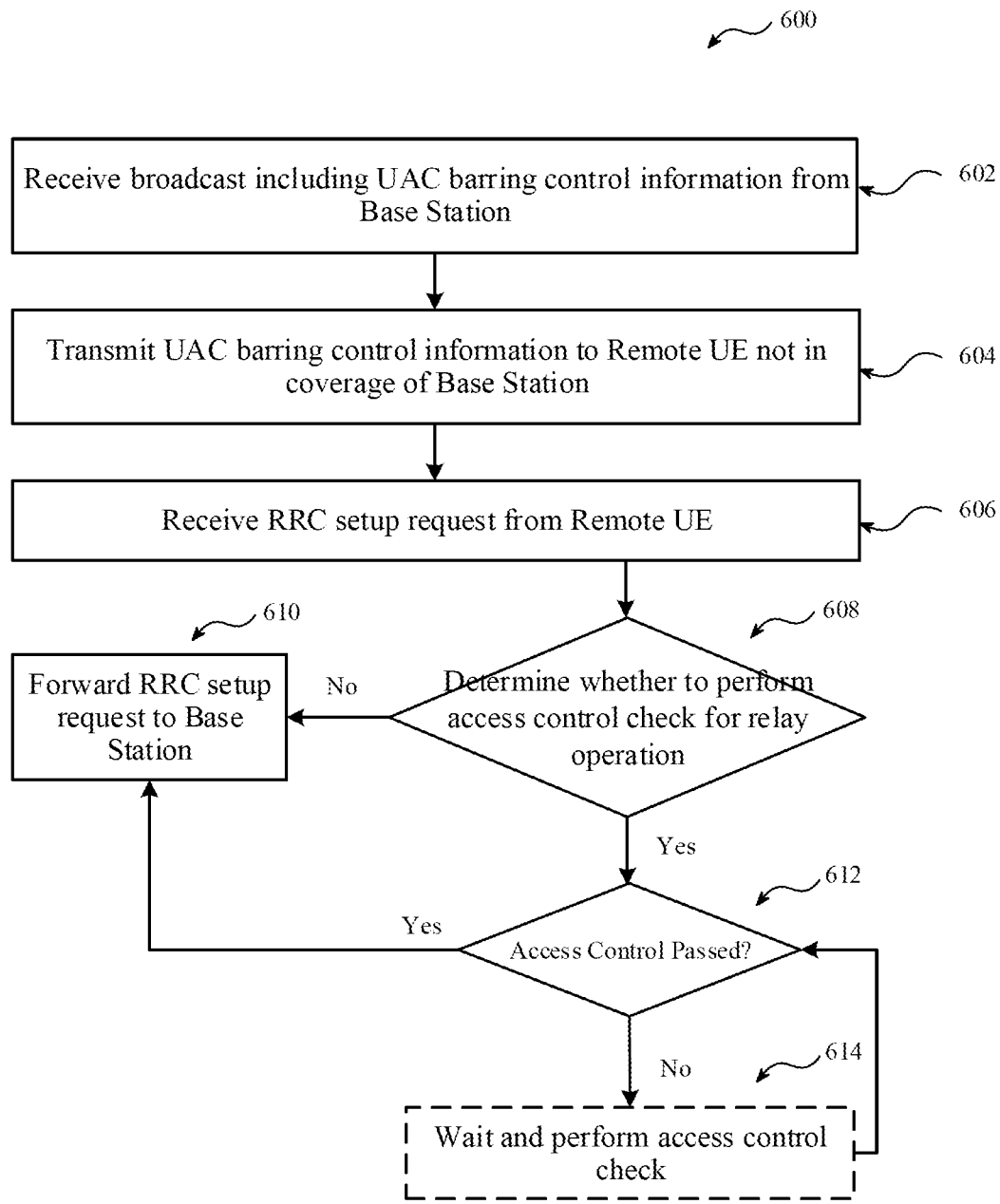
FIG. 6 illustrates a flow chart of a relay UE performing a sidelink relaying process including an enhanced UAC check according to one aspect of the disclosure.

FIG. 6 illustrates a flow chart outlining a method 600 for performing a sidelink relaying process with an enhanced UAC check according to one aspect of the disclosure. The method 600 may be performed by a relay UE.

At 602, the method includes receiving a broadcast including UAC barring control information from a BS. In one example the broadcast is SIB 1.

At 604, the method includes relaying the UAC barring control information to the remote UE.

At 606, the method includes receiving RRC setup request from the remote UE.

At 608, the method includes determining whether to perform an access control check for a relay operation for the remote UE.

At 610, the method includes forwarding the RRC setup request from the remote UE to the BS when the relay UE does not perform an access control check.

At 612, the method includes forwarding the RRC setup request from the remote UE to the BS when the relay UE performs the access control check and passes.

At 614, the method includes starting a barring timer and may wait the barring timer to expire and then to retry access control check when the relay UE is barred from relaying by the access control check.

Figure 7:
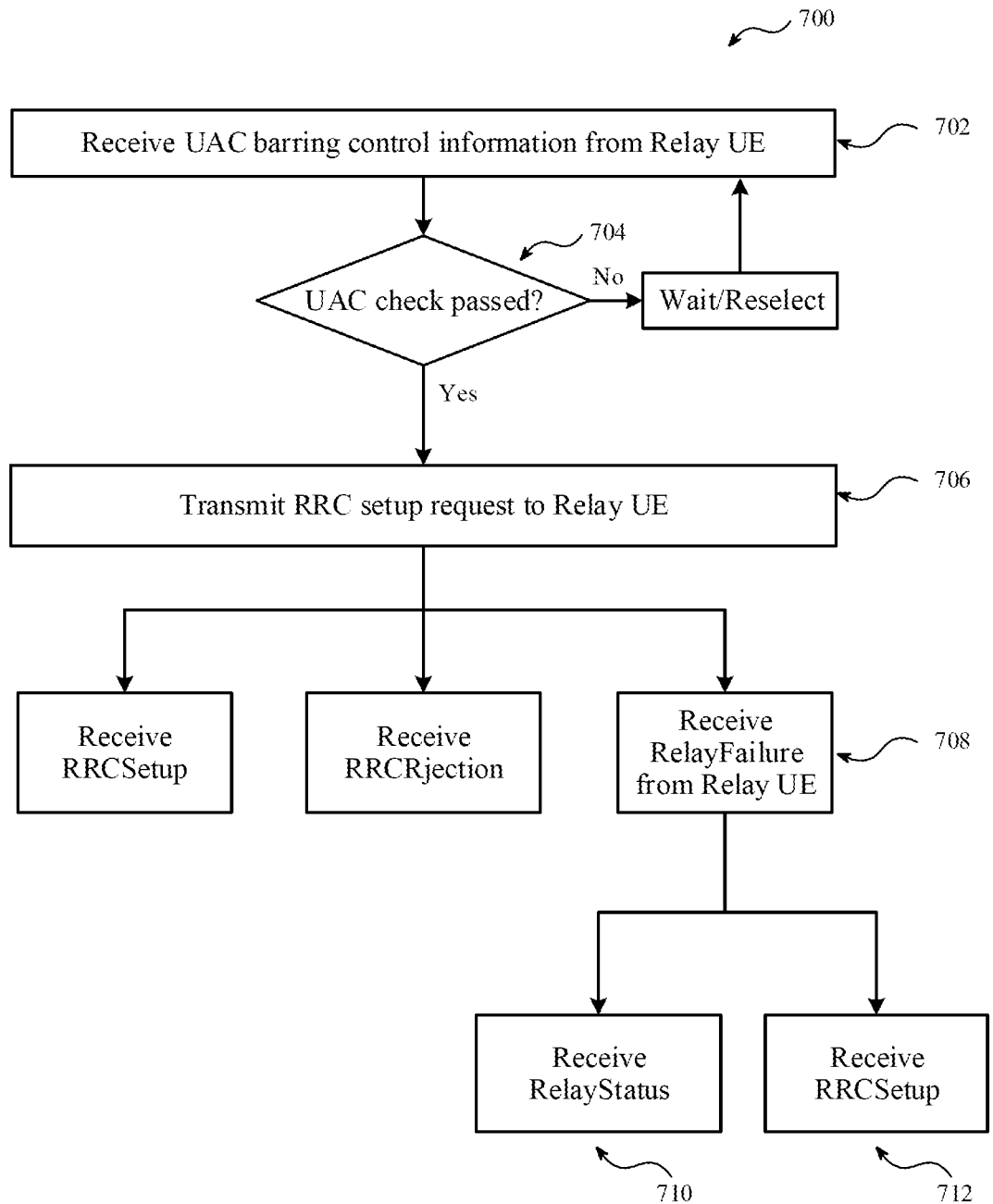
FIG. 7 illustrates a flow chart of a remote UE receiving a sidelink relaying process including an enhanced UAC check by a relay UE according to one aspect of the disclosure.

FIG. 7 illustrates a flow chart outlining a method 700 of performing an enhanced UAC check according to one aspect of the disclosure. The method 700 may be performed by a remote UE participating in a sidelink relay process.

At 702, the method includes receiving UAC barring control information from the relay UE.

At 704, the method includes performing an access control check. When the access control check is not passed, the access attempt barred from transmitting message to the relay UE, the RRC procedure ends, and a barring timer starts. The remote UE may wait and retry after the barring timer expires. The remote UE may also reselect another relay UE after one or more times of UAC check failures.

At 706, the method includes transmitting a RRC setup request to the relay UE and starts a first timer when the remote UE performs the access control check and passes. The remote UE then waits to receive feedback message from the relay UE. If the remote UE receives RRC setup message, the remote UE stops the first timer and perform RRC setup actions. If the remote UE receives RRC reject message, the remote UE stops the first timer and the RRC procedure ends.

At 708, the method includes waiting for a period of time indicated by the received relay failure and retrying the relay operation or reselect another relay UE if the remote UE receives relay failure message from the relay UE.

At 710, the method includes waiting for relay status message indicating RRC connection establishment with the BS and then transmits the RRC setup request to the BS through the relay UE.

At 712, the method includes waiting for RRC setup or RRC rejection message after the relay UE establishes RRC connection with the BS and transmits the buffered RRC setup request to the BS.

Figure 8:
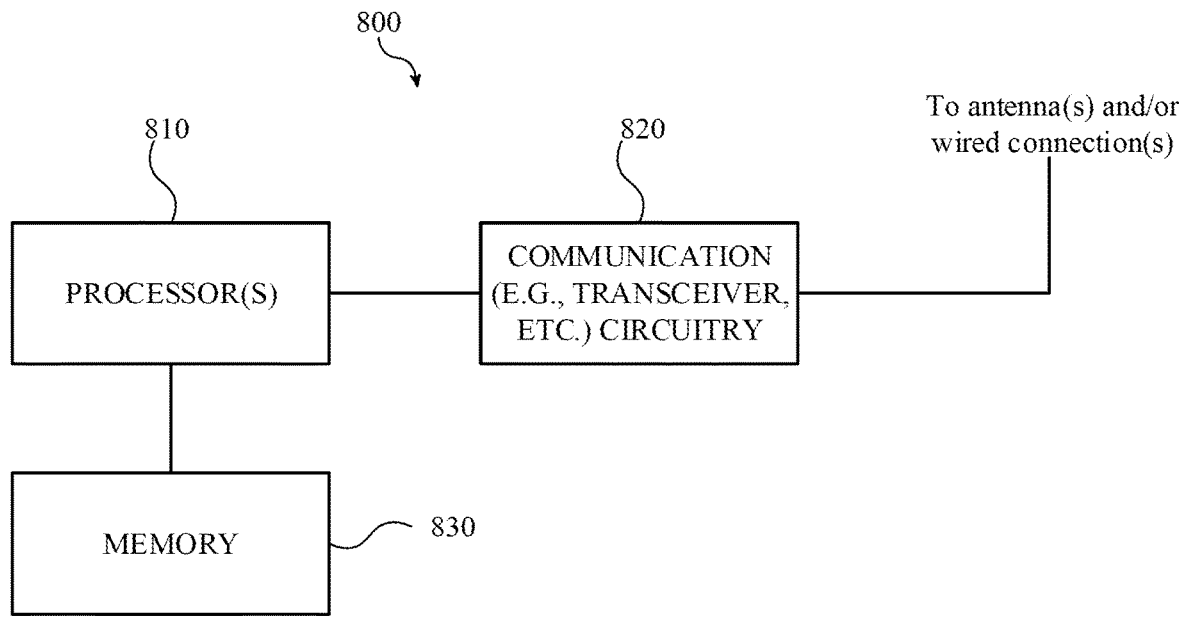
FIG. 8 illustrates a block diagram of an apparatus employable at a Base Station (BS), eNodeB, gNodeB or other network device, according to various aspects described herein.

Referring to FIG. 8, illustrated is a block diagram of an apparatus 800 employable at a Base Station (BS), such as eNodeB, gNodeB or other network device, according to various aspects described herein. In some aspects, the apparatus 800 may be included within the base station 102 in FIGS. 1-7. The apparatus 800 can include one or more processors (e.g., one or more baseband processors such as one or more of the baseband processors discussed in connection with FIG. 10 and/or FIG. 11) comprising processing circuitry 810 and associated interface(s) (e.g., one or more interface(s) discussed in connection with FIG. 11), transceiver circuitry 820 (e.g., which can comprise circuitry for one or more wired connections and/or part or all of RF circuitry 1006, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 830 (which can comprise any of a variety of storage mediums and can store instructions and/or data associated with one or more of processor(s) 810 or transceiver circuitry 820).

In particular, the term memory is intended to include an installation medium, e.g., a CD—ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 800 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 810, transceiver circuitry 820, and the memory 830 can be included in a single device, while in other aspects, they can be included in different devices, such as part of a distributed architecture. In some aspects, the one or more processors 810, the transceiver circuitry 820 and the memory circuit 830 may be implemented as part of a modem system on a single integrated circuit (IC). Alternately, in other aspects, the one or more processors 810, the transceiver circuitry 820 and the memory circuit 830 may be implemented on different ICs.

Figure 9:
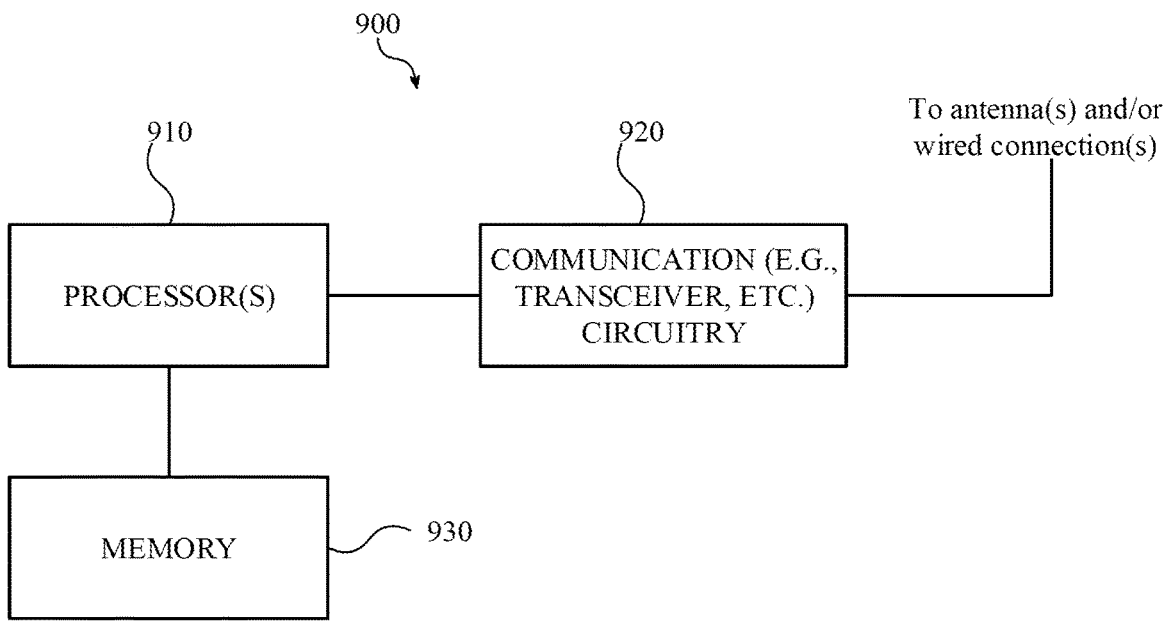
FIG. 9 illustrates a block diagram of an apparatus employable at a user equipment (UE) or other network device (e.g., IoT device), according to various aspects described herein.

Referring to FIG. 9, illustrated is a block diagram of an apparatus 900 employable at a user equipment (UE) according to various aspects described herein. In some aspects, the apparatus 900 may be included within the remote UE 108 or the relay UE 104 in FIGS. 1-7. Apparatus 900 can include one or more processors 910 (e.g., one or more baseband processors such as one or more of the baseband processors discussed in connection with FIG. 10 and/or FIG. 11) comprising processing circuitry and associated interface(s) (e.g., one or more interface(s) discussed in connection with FIG. 11), transceiver circuitry 920 (e.g., comprising part or all of RF circuitry 1006, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 930 (which can comprise any of a variety of storage mediums and can store instructions and/or data associated with one or more of processor(s) 910 or transceiver circuitry 920). In particular, the term memory is intended to include an installation medium, e. g., a CD—ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof.

In various aspects discussed herein, signals and/or messages can be generated and output for transmission, and/or transmitted messages can be received and processed. Depending on the type of signal or message generated, outputting for transmission (e.g., by processor(s) 910) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 910) can comprise one or more of: identifying physical resources associated with the signal/message, detecting the signal/message, resource element group deinterleaving, demodulation, descrambling, and/or decoding. In some aspects, the one or more processors 910, the transceiver circuitry 920 and the memory circuit 930 may be implemented as part of a modem system on a single integrated circuit (IC). Alternately, in other aspects, the one or more processors 910, the transceiver circuitry 920 and the memory circuit 930 may be implemented on different ICs.

Figure 10:
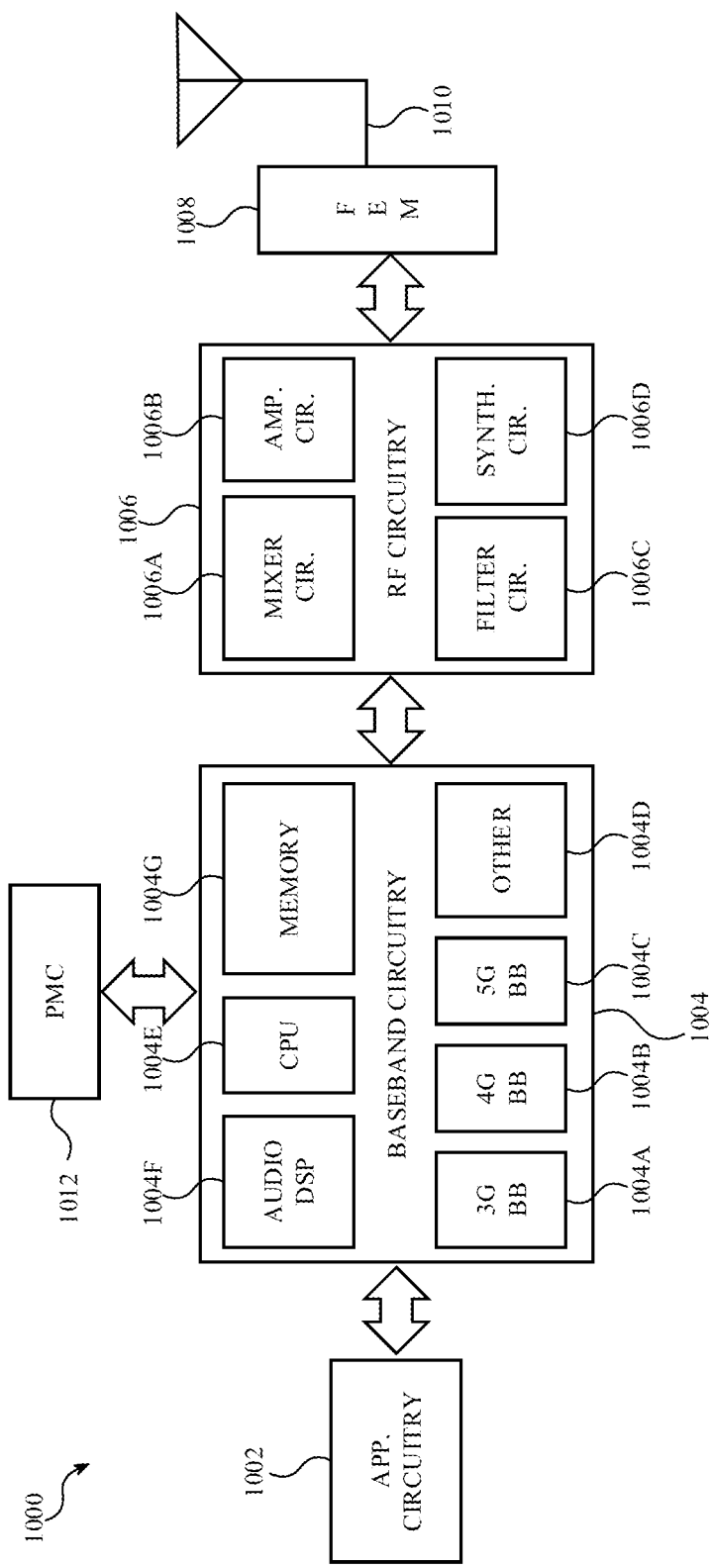
FIG. 10 illustrates example components of a device in accordance with some aspects.

FIG. 10 illustrates example components of a device 1000 in accordance with some aspects. In some aspects, the device 1000 can include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 can be included in a UE or a BS. In some aspects, the device 1000 can include fewer elements (e.g., a RAN node may not utilize application circuitry 1002, and instead include a processor/controller to process IP data received from a CN such as 5GC 720 or an Evolved Packet Core (EPC)). In some aspects, the device 1000 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 1002 can include one or more application processors. For example, the application circuitry 1002 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1000. In some aspects, processors of application circuitry 1002 can process IP data packets received from an EPC.

The baseband circuitry 1004 can include circuitry such as, but not limited to, one or more single-core or multi-core processors. The baseband circuitry 1004 can include one or more baseband processors or control logic to process baseband signals received from a receive signal path of the RF circuitry 1006 and to generate baseband signals for a transmit signal path of the RF circuitry 1006. Baseband processing circuitry 1004 can interface with the application circuitry 1002 for generation and processing of the baseband signals and for controlling operations of the RF circuitry 1006. For example, in some aspects, the baseband circuitry 1004 can include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), sixth generation (6G), etc.). The baseband circuitry 1004 (e.g., one or more of baseband processors 1004A-D) can handle various radio control functions that enable communication with one or more radio networks via the RF circuitry 1006. In other aspects, some or all of the functionality of baseband processors 1004A-D can be included in modules stored in the memory 1004G and executed via a Central Processing Unit (CPU) 1004E. The radio control functions can include, but are not limited to, signal modulation/demodulation, encoding/decoding, radio frequency shifting, etc. In some aspects, modulation/demodulation circuitry of the baseband circuitry 1004 can include Fast-Fourier Transform (FFT), preceding, or constellation mapping/demapping functionality. In some aspects, encoding/decoding circuitry of the baseband circuitry 1004 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1004 can include one or more audio digital signal processor(s) (DSP) 1004F. The audio DSP(s) 1004F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1004 and the application circuitry 1002 can be implemented together such as, for example, on a system on a chip (SOC).

In some aspects, the baseband circuitry 1004 can provide for communication compatible with one or more radio technologies. For example, in some aspects, the baseband circuitry 1004 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 1004 is configured to support radio communications of more than one wireless protocol can be referred to as multi-mode baseband circuitry.

RF circuitry 1006 can enable communication with wireless networks using modulated electromagnetic radiation through a non-solid medium. In various aspects, the RF circuitry 1006 can include switches, filters, amplifiers, etc. to facilitate the communication with the wireless network. RF circuitry 1006 can include a receive signal path which can include circuitry to down-convert RF signals received from the FEM circuitry 1008 and provide baseband signals to the baseband circuitry 1004. RF circuitry 1006 can also include a transmit signal path which can include circuitry to up-convert baseband signals provided by the baseband circuitry 1004 and provide RF output signals to the FEM circuitry 1008 for transmission.

In some aspects, the receive signal path of the RF circuitry 1006 can include mixer circuitry 1006*a*, amplifier circuitry 1006*b* and filter circuitry 1006*c*. In some aspects, the transmit signal path of the RF circuitry 1006 can include filter circuitry 1006*c* and mixer circuitry 1006*a*. RF circuitry 1006 can also include synthesizer circuitry 1006*d* for synthesizing a frequency for use by the mixer circuitry 1006*a* of the receive signal path and the transmit signal path. In some aspects, the mixer circuitry 1006*a* of the receive signal path can be configured to down-convert RF signals received from the FEM circuitry 1008 based on the synthesized frequency provided by synthesizer circuitry 1006*d*. The amplifier circuitry 1006*b* can be configured to amplify the down-converted signals and the filter circuitry 1006*c* can be a low-pass filter (LPF) or band-pass filter (BPF) configured to remove unwanted signals from the down-converted signals to generate output baseband signals. Output baseband signals can be provided to the baseband circuitry 1004 for further processing. In some aspects, the output baseband signals can be zero-frequency baseband signals, although this is not a requirement. In some aspects, mixer circuitry 1006*a* of the receive signal path can comprise passive mixers, although the scope of the aspects is not limited in this respect.

In some aspects, the mixer circuitry 1006*a* of the transmit signal path can be configured to up-convert input baseband signals based on the synthesized frequency provided by the synthesizer circuitry 1006*d* to generate RF output signals for the FEM circuitry 1008. The baseband signals can be provided by the baseband circuitry 1004 and can be filtered by filter circuitry 1006*c*.

In some aspects, the mixer circuitry 1006*a* of the receive signal path and the mixer circuitry 1006*a* of the transmit signal path can include two or more mixers and can be arranged for quadrature downconversion and upconversion, respectively. In some aspects, the mixer circuitry 1006*a* of the receive signal path and the mixer circuitry 1006*a* of the transmit signal path can include two or more mixers and can be arranged for image rejection (e.g., Hartley image rejection). In some aspects, the mixer circuitry 1006*a* of the receive signal path and the mixer circuitry 1006*a* can be arranged for direct downconversion and direct upconversion, respectively. In some aspects, the mixer circuitry 1006*a* of the receive signal path and the mixer circuitry 1006*a* of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1006 can include analog-to-digital converter (ADC) and digital-to-analog converter (DAC) circuitry and the baseband circuitry 1004 can include a digital baseband interface to communicate with the RF circuitry 1006.

In some dual-mode aspects, a separate radio IC circuitry can be provided for processing signals for each spectrum, although the scope of the aspects is not limited in this respect. In some aspects, the synthesizer circuitry 1006*d* can be a fractional-N synthesizer or a fractional N/N+1 synthesizer, although the scope of the aspects is not limited in this respect as other types of frequency synthesizers can be suitable. For example, synthesizer circuitry 1006*d* can be a delta-sigma synthesizer, a frequency multiplier, or a synthesizer comprising a phase-locked loop with a frequency divider. The synthesizer circuitry 1006*d* can be configured to synthesize an output frequency for use by the mixer circuitry 1006*a* of the RF circuitry 1006 based on a frequency input and a divider control input. In some aspects, the synthesizer circuitry 1006*d* can be a fractional N/N+1 synthesizer.

In some aspects, frequency input can be provided by a voltage controlled oscillator (VCO), although that is not a requirement. Divider control input can be provided by either the baseband circuitry 1004 or the applications processor 1002 depending on the desired output frequency. In some aspects, a divider control input (e.g., N) can be determined from a look-up table based on a channel indicated by the applications processor 1002.

Synthesizer circuitry 1006*d* of the RF circuitry 1006 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1006*d* can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 1006 can include an IQ/polar converter.

FEM circuitry 1008 can include a receive signal path which can include circuitry configured to operate on RF signals received from one or more antennas 1010, amplify the received signals and provide the amplified versions of the received signals to the RF circuitry 1006 for further processing. FEM circuitry 1008 can also include a transmit signal path which can include circuitry configured to amplify signals for transmission provided by the RF circuitry 1006 for transmission by one or more of the one or more antennas 1010. In various aspects, the amplification through the transmit or receive signal paths can be done solely in the RF circuitry 1006, solely in the FEM 1008, or in both the RF circuitry 1006 and the FEM 1008.

In some aspects, the FEM circuitry 1008 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1006). The transmit signal path of the FEM circuitry 1008 can include a power amplifier (PA) to amplify input RF signals (e.g., provided by RF circuitry 1006), and one or more filters to generate RF signals for subsequent transmission (e.g., by one or more of the one or more antennas 1010).

In some aspects, the PMC 1012 can manage power provided to the baseband circuitry 1004. In particular, the PMC 1012 can control power-source selection, voltage scaling, battery charging, or DC-to-DC conversion. The PMC 1012 can often be included when the device 1000 is capable of being powered by a battery, for example, when the device is included in a UE. The PMC 1012 can increase the power conversion efficiency while providing desirable implementation size and heat dissipation characteristics.

While FIG. 10 shows the PMC 1012 coupled only with the baseband circuitry 1004. However, in other aspects, the PMC 1012 may be additionally or alternatively coupled with, and perform similar power management operations for, other components such as, but not limited to, application circuitry 1002, RF circuitry 1006, or FEM 1008.

In some aspects, the PMC 1012 can control, or otherwise be part of, various power saving mechanisms of the device 1000. For example, if the device 1000 is in an RRC_Connected state, where it is still connected to the RAN node as it expects to receive traffic shortly, then it can enter a state known as Discontinuous Reception Mode (DRX) after a period of inactivity. During this state, the device 1000 can power down for brief intervals of time and thus save power.

If there is no data traffic activity for an extended period of time, then the device 1000 can transition off to an RRC Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1002 and processors of the baseband circuitry 1004 can be used to execute elements of one or more instances of a protocol stack. For example, processors of the baseband circuitry 1004, alone or in combination, can be used execute Layer 3, Layer 2, or Layer 1 functionality, while processors of the application circuitry 1004 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 11:
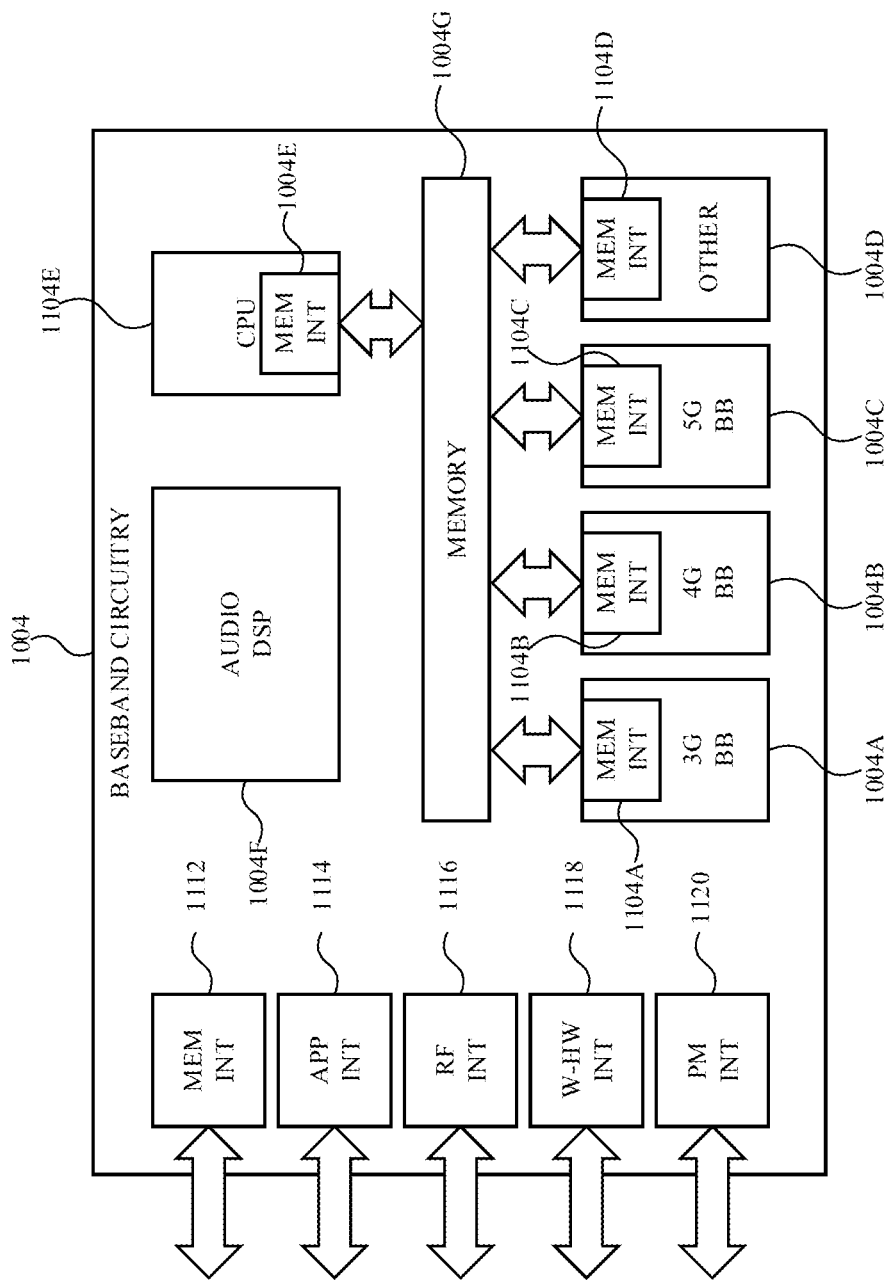
FIG. 11 illustrates example interfaces of baseband circuitry in accordance with some aspects.

FIG. 11 illustrates example interfaces of baseband circuitry in accordance with some aspects. As discussed above, the baseband circuitry 1004 of FIG. 10 can comprise processors 1004A-1004E and a memory 1004G utilized by said processors. Each of the processors 1004A-1004E can include a memory interface, 1104A-1104E, respectively, to send/receive data to/from the memory 1004G.

The baseband circuitry 1004 can further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 802 of FIG. 2), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012).

In various aspects, aspects discussed herein can facilitate techniques of sidelink relay adopting access control enhancement. A remote UE is configured to perform an access control check to determine whether an access attempt is authorized based on a barring control information received from a relay UE. A relay UE is configured to receive a RRC setup request from the remote UE and forward the RRC setup request to a BS with or without performing another access control check. The relay UE may be configured to perform an enhanced UAC check using an appointed Access Category, using UAC barring information (e.g., Access Identity and an Access Category) based on or provided by the remote UE, or using a new Access Category specifically applied to the relaying operation. The relay UE may be further configured to reattempt relay operations with or without buffering the RRC setup request received from the remote UE.

In one aspect of the disclosure, a UE configured as a relay UE between a remote UE and a base station is disclosed. The UE comprises one or more processors configured to receive a RRC signaling to request for establishing or resuming RRC connection from the remote UE, determine whether to perform an access control check prior to forwarding the RRC signaling of the remote UE to the base station, and forward the RRC Signaling to the base station based on the determination.

In one aspect of the disclosure, a UE configured as a remote UE using a relay UE to communicate with a base station is disclosed. The UE comprises one or more processors configured to receive a UAC barring control information from the relay UE and perform an access control check to determine whether an access attempt is authorized by the based station based on the received UAC barring control information. The one or more processors are further configured to transmit a RRC signaling to request for establishing or resuming RRC connection to the relay UE in response to determining that the access attempt is authorized and starting a first timer when transmitting the RRC signaling. The one or more processors are further configured to receive a RRC setup/reject message from the base station through the relay UE or a relay failure message from the relay UE, and stopping the first timer in response to receiving the RRC setup/reject message or the relay failure message.

In one aspect of the disclosure, a method for a UE to operate as a relay UE between a remote UE and a base station is disclosed. The method comprises receiving a unified access control (UAC) barring control information from the base station; transmitting the UAC barring control information to the remote UE; receiving a radio resource control (RRC) setup request from the remote UE; and determining whether to perform an access control check prior to forwarding the RRC signaling to the base station. The method further comprises forwarding the RRC signaling of the remote UE to the base station in response to determining not to perform the access control check and transmitting a relay failure information to the remote UE and starting a barring timer in response to determining to perform the access control check and determining that the RRC signaling is barred by the access control check.

While the disclosure has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

EXAMPLES

Example 1 is a UE, configured as a relay UE between a remote UE and a base station and comprising one or more processors configured to receive a radio resource control (RRC) signaling to request for establishing or resuming RRC connection from the remote UE, determine whether to perform an access control check prior to forwarding the RRC signaling of the remote UE to the base station, and forward the RRC Signaling to the base station based on the determination.

Example 2 is a UE, including the subject matter of example 1, wherein the one or more processors are configured to determine whether to perform the access control check according to an indication associated with barring control information received from the base station.

Example 3 is a UE, including the subject matter of examples 1 and 2, wherein the barring control information includes UAC barring control information in a system information block (SIB1) received via a broadcast from the base station.

Example 4 is a UE, including the subject matter of example 1, wherein the one or more processors are configured to determine not to perform the access control check and in response, forward the RRC signaling of the remote UE to the base station without performing the access control check.

Example 5 is a UE, including the subject matter of example 1, wherein the one or more processors are configured to determine to perform the access control check, start a first barring timer when the RRC signaling is barred by the access control check, and transmit relay failure information to the remote UE when the RRC signaling is barred by the access control check.

Example 6 is a UE, including the subject matter of examples 1 and 5, wherein the one or more processors are further configured to receive a second RRC signaling to request for establishing or resuming RRC connection from a second remote UE different from the remote UE, perform a second access control check for the second remote UE while the first barring timer is not expired, and start a second barring timer for the second remote UE when the second RRC signaling is barred.

Example 7 is a UE, including the subject matter of examples 1 and 5, wherein the one or more processors are further configured to perform a second access control check when the first barring timer expires, establish a RRC connection with the base station when the second access control check does not bar the RRC connection, transmit relay status information to the remote UE, the relay status information indicating that the relay UE entered a connected state, and receive a second RRC signaling from the remote UE, and forward the second RRC signaling to the base station.

Example 8 is a UE, including the subject matter of examples 1 and 5, wherein the one or more processors are further configured to transmit a wait time to the remote UE with the relay failure information, wherein the wait time is related to the first barring timer, perform a second access control check when the first barring timer expires, and forward the RRC signaling of the remote UE to the base station when the RRC signaling is not barred by the second access control check.

Example 9 is a UE, including the subject matter of example 1, wherein the one or more processors are configured to use access category 8 (AC8) mobile originated (MO) signaling for RRC to perform the access control check.

Example 10 is a UE, including the subject matter of example 1, wherein the one or more processors are configured to check content of the RRC signaling to perform the access control check.

Example 11 is a UE, including the subject matter of example 10, wherein the one or more processors are configured to receive unified access control (UAC) barring information from the remote UE, the UAC barring information including an Access Category and an access identity (AI) of the remote UE, receive UAC barring control information from the base station, and perform the access control check using the received UAC barring information and the receive UAC barring control information Example 12 is a UE, including the subject matter of example 10, wherein the one or more processors are configured to determine whether to perform the access control based on a comparison of an Access Category related to the RRC signaling with a previous Access Category related to a previous RRC signaling received from the same or different remote UE.

Example 13 is a UE, including the subject matter of example 1, wherein the one or more processors are further configured to receive a unified access control (UAC) barring control information from the base station and transmit the UAC barring control information to the remote UE. Wherein the UAC barring control information is included in a system information block (SIB1) broadcast from the base station and wherein RRC state information of the relay UE is transmitted to the remote UE together with the UAC barring control information.

Example 14 is a UE, including the subject matter of example 1, wherein the one or more processors are further configured to broadcast a relay discovery message including RRC state information of the relay UE and relay indication information.

Example 15 is a UE, configured as a remote UE using a relay UE to communicate with a base station, comprising one or more processors configured to receive a unified access control (UAC) barring control information from the relay UE, perform an access control check to determine whether an access attempt is authorized by the based station based on the received UAC barring control information, transmit a radio resource control (RRC) signaling to request for establishing or resuming RRC connection to the relay UE in response to determining that the access attempt is authorized and starting a first timer when transmitting the RRC signaling, and receive a RRC setup/reject message from the base station through the relay UE or a relay failure message from the relay UE, and stopping the first timer in response to receiving the RRC setup/reject message or the relay failure message.

Example 16 is a UE, including the subject matter of example 15, wherein the one or more processors are configured retransmit the RRC signaling one or more times to the relay UE after a wait time period in response to receiving the RRC rejection message or the relay failure message. Wherein the RRC signaling is retransmitted to the relay UE without performing the access control check.

Example 17 is a UE, including the subject matter of example 15, wherein the one or more processors are configured to receive the relay failure message from the relay UE, the relay failure message including a wait time based on a barring timer of the relay UE, start a second timer, stop the second timer and transmit the RRC signaling when receiving a relay status message from the relay UE, and receive the RRC setup/reject message from the base station through the relay UE.

Example 18 is a UE, including the subject matter of examples 15 and 17, wherein the one or more processors are configured to reselect another relay UE when the second timer expires.

Example 19 is a UE, including the subject matter of example 15, wherein the one or more processors are configured to receive the relay failure message from the relay UE extend the first timer with the wait time and stop the first timer in response to receiving the RRC setup/reject message from the base station through the relay UE. The relay failure message includes a wait time based on a barring timer of the relay UE.

Example 20 is a UE, including the subject matter of examples 15 and 19, wherein the one or more processors are configured to select another relay UE when the extended first timer expires.

Example 21 is a UE, including the subject matter of example 15, wherein the one or more processors are configured to transmit UAC barring information to the relay UE, the UAC barring information including an Access Category and an access identity (AI) of the remote UE.

Example 22 is a UE, including the subject matter of example 15, wherein the one or more processors are configured to wherein the one or more processors are further configured to receive RRC state information of the relay UE together with the UAC barring control information and trigger relay reselection based on the received RRC state information and the UAC barring control information.

Example 23 is a UE, including the subject matter of example 15, wherein the one or more processors are configured to receive a relay discovery message that includes RRC state information of the relay UE and relay indication information.

Example 24 is a method for a user equipment (UE) to operate as a relay UE between a remote UE and a base station and comprising receiving a unified access control (UAC) barring control information from the base station, transmitting the UAC barring control information to the remote UE, receiving a radio resource control (RRC) setup request from the remote UE, and determining whether to perform an access control check prior to forwarding the RRC signaling to the base station. The method further comprises forwarding the RRC signaling of the remote UE to the base station in response to determining not to perform the access control check and transmitting a relay failure information to the remote UE and starting a barring timer in response to determining to perform the access control check and determining that the RRC signaling is barred by the access control check.

Example 25 is a method, including the subject matter of example 24, further comprising using Access Category 8

(AC8) mobile originated (MO) signaling for RRC to perform the access control check.

Example 26 is a method, including the subject matter of example 24, further comprising checking content of the RRC signaling to perform the access control check.

Example 27 is a method, including the subject matter of example 24, further comprising determining whether to perform the access control check according to the UAC barring control information received from the base station.

Example 28 is a method, including the subject matter of example 24, further comprising determining whether to perform the access control check based on a comparison of an Access Category of the RRC signaling to a previous Access Category of a previous RRC signaling received from the same or different remote UE.

Example 29 is a method, including the subject matter of example 24, further comprising receiving a second RRC signaling from a second remote UE different from the remote UE, performing a second access control check for the second remote UE while the barring timer is not expired, and starting a second timer for the second remote UE when the second RRC signaling is barred.

Example 30 is a method, including the subject matter of example 24, wherein the UAC barring control information is included in a defined system information block (SIB1) broadcast from the base station, and RRC state information of the relay UE is included in the SIB1 and transmitted to the remote UE together with the UAC barring control information Example 31 is a method, including the subject matter of example 24, further comprising broadcasting a relay discovery message including RRC state information of the relay UE and relay indication information.

Example 32 is a method, including the subject matter of example 24, further comprising transmitting a wait time to the remote UE with the relay failure information, wherein the wait time is related to the barring timer, performing a second access control check when the barring timer expires, and forwarding the RRC signaling of the remote UE to the base station when not barred by the second access control check.

Example 33 is a method, including the subject matter of example 24, further comprising performing a second access control check when the barring timer expires, establishing a RRC connection with the base station when not barred by the second access control check, transmitting relay status information to the remote UE, receiving a second RRC signaling from the remote UE, and forwarding the second RRC signaling to the base station.

Example 34 is a method that includes any action or combination of actions as substantially described herein in the Detailed Description.

Example 35 is a method as substantially described herein with reference to each or any combination of the Figures included herein or with reference to each or any combination of paragraphs in the Detailed Description.

Example 36 is a user equipment configured to perform any action or combination of actions as substantially described herein in the Detailed Description as included in the user equipment.

Example 37 is a network node configured to perform any action or combination of actions as substantially described herein in the Detailed Description as included in the network node.

Example 38 is a non-volatile computer-readable medium that stores instructions that, when executed, cause the performance of any action or combination of actions as substantially described herein in the Detailed Description.

Example 39 is a baseband processor of a user equipment configured to perform any action or combination of actions as substantially described herein in the Detailed Description as included in the user equipment.

Example 40 is a baseband processor of a network node configured to perform any action or combination of actions as substantially described herein in the Detailed Description as included in the user equipment.

What is claimed is:

1. A user equipment (UE) configured as a relay UE between a remote UE and a base station, comprising:
   a memory configured to store instructions;
   one or more processors, when executing the instructions, configured to cause the UE to:
      receive, via a broadcast from the base station, unified access control (UAC) barring control information;
      forward, to the remote UE, the UAC barring control information;
      receive, from the remote UE, a radio resource control (RRC) signaling to request for establishing or resuming RRC connection;
      without performing a unified access control check, forward the RRC signaling of the remote UE to the base station.

2. The UE of claim 1, wherein the UAC barring control information is received in a system information block (SIB1).

3. The UE of claim 1,
   wherein RRC state information of the relay UE is transmitted to the remote UE together with the UAC barring control information.

4. The UE of claim 1, wherein the one or more processors are further configured to broadcast a relay discovery message including RRC state information of the relay UE and relay indication information.

5. A user equipment (UE) configured as a remote UE using a relay UE to communicate with a base station, comprising:
   one or more processors configured to:
   receive a unified access control (UAC) barring control information from the relay UE;
   perform an access control check to determine whether an access attempt is authorized by the base station based on the received UAC barring control information;
   transmit a radio resource control (RRC) signaling to request for establishing or resuming RRC connection to the relay UE in response to determining that the access attempt is authorized and starting a first timer when transmitting the RRC signaling; and
   receive a RRC setup/reject message from the base station through the relay UE or a relay failure message from the relay UE, and stopping the first timer in response to receiving the RRC setup/reject message or the relay failure message.

6. The UE of claim 5, wherein the one or more processors are configured to:
   retransmit the RRC signaling one or more times to the relay UE after a wait time period in response to receiving the RRC rejection message or the relay failure message;
   wherein the RRC signaling is retransmitted to the relay UE without performing the access control check.

7. The UE of claim 5, wherein the one or more processors are configured to:

receive the relay failure message from the relay UE, the relay failure message including a wait time based on a barring timer of the relay UE;

start a second timer;

stop the second timer and transmit the RRC signaling in response to receiving a relay status message from the relay UE; and receive the RRC setup/reject message from the base station through the relay UE.

8. The UE of claim 7, wherein the one or more processors are further configured to reselect another relay UE when the second timer expires.

9. The UE of claim 5, wherein the one or more processors are configured to:

receive the relay failure message from the relay UE, the relay failure message including a wait time based on a barring timer of the relay UE;

extend the first timer with the wait time; and stop the first timer in response to receiving the RRC setup/reject message from the base station through the relay UE.

10. The UE of claim 9, wherein the one or more processors are further configured to select another relay UE when the extended first timer expires.

11. The UE of claim 5, wherein the one or more processors are configured to transmit UAC barring information to the relay UE, the UAC barring information including an Access Category and an access identity (AI) of the remote UE.

12. The UE of claim 5, wherein the one or more processors are further configured to receive RRC state information of the relay UE together with the UAC barring control information and trigger relay reselection based on the received RRC state information and the UAC barring control information.

13. The UE of claim 5, wherein the one or more processors are further configured to receive a relay discovery message that includes RRC state information of the relay UE and relay indication information.

14. A method for a user equipment (UE) to operate as a relay UE between a remote UE and a base station, comprising:

receiving a unified access control (UAC) barring control information from the base station;

transmitting the UAC barring control information to the remote UE;

receiving a radio resource control (RRC) setup request from the remote UE; and determining whether to perform an access control check prior to forwarding the RRC signaling to the base station:

forwarding the RRC signaling of the remote UE to the base station in response to determining not to perform the access control check; and transmitting a relay failure information to the remote UE and starting a barring timer in response to determining to perform the access control check and determining that the RRC signaling is barred by the access control check.

15. The method of claim 14, further comprising using Access Category 8 (AC8) mobile originated (MO) signaling for RRC to perform the access control check.

16. The method of claim 14, further comprising checking content of the RRC signaling to perform the access control check.

17. The method of claim 14, further comprising determining whether to perform the access control check according to the UAC barring control information received from the base station.

18. The method of claim 14, further comprising determining whether to perform the access control check based on a comparison of an Access Category of the RRC signaling to a previous Access Category of a previous RRC signaling received from the same or different remote UE.

19. The method of claim 14, further comprising:

receiving a second RRC signaling from a second remote UE different from the remote UE;

performing a second access control check for the second remote UE while the barring timer is not expired; and starting a second timer for the second remote UE when the second RRC signaling is barred.

20. The method of claim 14, wherein the UAC barring control information is included in a defined system information block (SIB1) broadcast from the base station; and RRC state information of the relay UE is included in the SIB1 and transmitted to the remote UE together with the UAC barring control information.

* * * * *